UNITED STATES PATENT OFFICE 2,521,674

PROCESS OF PREPARING ORGANO-SILOXANE RESINS

Edgar C. Britton, Midland, Mich., and Laurence W. Byers, Urbana, Ill., assignors to The Dow Chemical Company, a corporation of Delaware No Drawing. Application March 29, 1947, Serial No. 738,232

5 Claims. (Cl. 260—46.5)

This invention relates to the preparation of organosiloxane resins of high molecular weight. It is particularly concerned with the preparation of complex condensation products from organosiloxanes of much lower molecular weight, e. g. containing an average of 20 silicon atoms, or less, in the molecule.

The organosiloxane starting materials of interest in this invention are those which have an average of from 1.0 to 1.9, and preferably from 1.5 to 1.8, hydrocarbon radicals per silicon atom, at least a portion of which are aryl radicals and the remainder consisting of lower alkyl radicals. The invention is particularly advantageous for the resinification of such organosiloxanes when from 50 to 100 percent of said hydrocarbon radicals are phenyl radicals. Such products are conveniently prepared by the hydrolysis of suitable mixtures of organosilanes, e. g. $RSiX_3$, and $R_2'SiX_2'$, where R and R' represent hydrocarbon radicals, such as alkyl and aryl radicals, and X and X' represent readily hydrolyzable groups such as halogen atoms, alkoxy radicals, aryloxy radicals, or other hydrocarbonoxy radicals, etc. Condensation of the hydrolysis products takes place concurrently with the hydrolysis, producing soluble polymers, usually liquids, which are satisfactory for use in this invention. The process of this invention may also be employed with advantage when the hydrolyzable silanes include minor amounts of an inorganic tetrahalosilane, a triorganohalosilane, etc.

Condensation products of the type described may be, and in this invention are, employed in the production of complex organosiloxane polymers of resinous character, such as hard, moisture- and solvent-resistant solids, which are valuable as coating and impregnating agents. Although methods are known for effecting the conversion of normally liquid organosiloxanes to hard, solvent-resistant solids, such methods are not always satisfactory. For example, liquid phenylalkylpolysiloxanes containing an average of 1.0–1.9 hydrocarbon radicals per silicon atom, at least 50 percent of which are phenyl radicals, and the remainder ethyl or methyl radicals, may be heated, e. g. at 150°–250° C., or thereabouts, whereby they are converted into resinous materials which are solid at room temperature, but soften at elevated temperatures. It is extremely difficult to further polymerize the latter materials, or to convert them into products which are not affected by heating, without at the same time losing a large part of the organic radicals of the polysiloxane molecule. Furthermore, when employing the methods heretofore available, it is difficult to arrest the resinification at a point where the polymer is still soluble in organic solvents. Instead, the products frequently contain solid, solvent-resistant polymeric masses or hard gels which cannot be readily fabricated into useful form. This troublesome condition occurs even in the presence of a large excess of solvent for the polysiloxane material.

It is an object of this invention to provide an improved method for the production of complex, heat-hardenable polysiloxanes.

It is a further object to convert low molecular weight polysiloxanes into complex, heat-hardenable products with little or no formation of objectionable, insoluble gels.

Other objects will be apparent from the following description.

We have found that organosiloxane polymers of the type described above may be polymerized in a stepwise manner to produce heat-hardenable polymers of much higher molecular weight, without the formation of insoluble gels or other non-useful products. In brief, our process comprises treating said organosiloxanes with an alkaline reacting substance in a portionwise manner in the presence of a liquid diluent which is substantially inert under the reaction conditions employed. The process may be carried out over a wide range of temperatures, e. g. from room temperature, or below, to 100° C. or higher. Frequently it is advantageous to maintain the reaction mixture at a temperature at which the diluent refluxes.

As an alkaline reacting substance, we prefer an alkali metal hydroxide, e. g. sodium hydroxide, but other alkaline agents may be employed if desired. Usually a portion of the alkali is consumed in the reaction, due presumably with formation of alkali metal salts of unknown identity. In any case, it has been observed that following the addition of a small portion of alkali to a polymerization mixture, e. g. 0.5 to 1.0 molecular equivalent weight of alkali per 400 atomic weights of silicon, the viscosity of the reaction mixture increases noticeably until an apparent state of equilibrium is attained, after which no further change in viscosity can be observed. However, the addition of another portion of alkali or the removal of a portion of the diluent from the reaction mixture results in further increase in viscosity. By operating in a stepwise manner as just indicated, the rate of increase in viscosity, and accordingly the rate of growth in the polymer size of the organopolysiloxane may be readily controlled throughout the process, and may be arrested at any desired point.

The process of this invention has the further advantage of being operable without requiring the presence of a large concentration of diluent. The diluents which are preferred are aromatic liquid hydrocarbons such as benzene, toluene and xylene, although other compounds, e. g. chlorinated hydrocarbons, petroleum fractions, alcohols, and ethers, etc., distilling within the range 80–180° C., may also be used. The optimum concentration of diluent in the reaction mixture varies of course with the starting materials, and the conditions under which the reaction is conducted. In general, the more diluent there is present in the reaction mixture, the less is the tendency toward formation of hard gels or solid polymers. Usually we prefer to use a polymerization mixture which contains from 40 to 99 per cent by weight of the organosiloxane, although more dilute solutions may be employed.

In a preferred embodiment of the invention, from 40 to 75 parts by weight of an organosiloxane polymer is admixed with, or dispersed in, from 60 to 25 parts of an inert diluent such as toluene. To the mixture is added sufficient sodium hydroxide, preferably as an aqueous 50 per cent solution, to give a ratio of approximately 1 gram molecular equivalent of sodium hydroxide for each 400 gram atoms of silicon present. The resultant mixture is stirred until no further increase in viscosity is detectable. A second portion of alkali is then added. This stepwise addition of alkali is continued until a total of about 4-6 gram mols of alkali has been added per 400 gram atoms of silicon in the material under treatment. Thereafter, the reaction mixture is concentrated in a stepwise manner, by intermittently distilling off portions of the solvent, together with water present in the reaction mixture, until the desired viscosity is obtained.

Residual alkali may be removed in usual ways, e. g. by careful neutralization with acids such as hydrogen chloride, acetic acid, etc., or preferably by treatment of the organopolysiloxane solution with carbon dioxide to precipitate an alkali metal carbonate, followed by filtration to remove the precipitate.

The following examples will serve to illustrate the invention, but are not to be construed as limiting its scope:

Example 1

A mixture consisting for the most part of phenylethyldichlorosilane, but containing minor amounts of phenyltrichlorosilane and ethyltrichlorosilane, was hydrolized by treatment with water. After washing the product several times with water, and neutralizing last traces of hydrogen chloride, there was obtained a liquid product which, when dissolved in an equal weight of toluene, formed a solution having a viscosity of about 5 centistokes at 25° C.

Approximately 70 parts by weight of this liquid product was mixed with 30 parts of toluene, and 0.05 part of sodium hydroxide was added. The mixture was heated with stirring, at a temperature of approximately 80° C. for 16 hours, at which time a second portion, 0.05 part, of sodium hydroxide was added, and refluxing continued. The procedure was repeated until a total of 0.30 part by weight of sodium hydroxide had been added. This corresponds to approximately 6 molecular equivalents of sodium hydroxide for each 400 gram atoms of silicon present in the phenylethylsiloxane starting material. Solvent and water were then removed by distillation so as to give a product concentration of approximediately 80 percent. The resulting material was heated under reflux for successive periods of about 17 hours, after each of which it was concentrated further to remove solvent and water until a concentration of approximately 95 percent solids was obtained. The viscosity of a 50 percent solution of the product in toluene was 15 centistokes.. Residual solvent was volatilized and 0.19 part of sodium hydroxide was added. The resultant mixture was then heated at approximately 80° C. for several hours. The final product was completely soluble in toluene. A 50 percent solution of the product in toluene had a viscosity of 30 centistokes.

In another experiment, a single addition was made of 0.1 part by weight of sodium hydroxide to 70 parts of the liquid hydrolysis product employed as a starting material in the previous run. The mixture was heated at 80° C. for 2 hours. A hard gel was obtained.

Example 2

Phenylmethyldichlorosilane containing minor amounts of phenyltrichlorosilane and methyltrichlorosilane was reacted with water, and the oily condensation product was collected and purified.

A 70 percent solution of the oil in toluene was treated with alkali, by procedure similar to that described in Example 1. Five portions of alkali, as a 50 percent aqueous sodium hydroxide solution, were added, each portion being equivalent to 1 Na for each 400 Si. Between additions, the reaction mixture was heated under reflux. When the addition of alkali was complete, solvent was volatilized periodically so as to increase the concentration of solids about 2 percent at a step until a concentration of approximately 76 percent solids was reached. The mixture was then heated under reflux for several hours. A 76 percent solution of the final product in toluene had a viscosity of over 27,000 centistokes at 25° C., and a 50 percent solution of the product in toluene had a viscosity of 83.4 centistokes at 25° C.

The product was applied as a film, of 2.5 mils thickness, to copper test plates and cured to a tack-free condition by heating the plates at 250° C. During heating, test plates were periodically removed, cooled, and tested to determine the flexibility of the coating thereon. It was found that the coatings on test plates heated at 250° C. for up to 180 hours and even longer did not break when the plates were bent over an eighth inch mandrel.

Example 3

A liquid polymer of low molecular weight was prepared by careful hydrolysis of phenyltrichlorosilane. Approximately 43 grams of the liquid product was mixed with 25.9 grams of toluene and 0.3 grams of aqueous 50 percent sodium hydroxide was added. The mixture was allowed to stand at room temperature with stirring for 4 hours. During this time it increased in viscosity from less than 45 centistokes to 750 centistokes.

Residual sodium hydroxide was neutralized with hydrogen chloride, after which toluene was distilled off. The product was heated at 70°–80° C. for 45 minutes, and subsequently at 80°–90° C. at 8 millimeters absolute pressure for 45 minutes. A foamy, glassy material, completely soluble in toluene, was obtained. A 50 percent solution of the polymer in benzene had a viscosity of 112 centistokes.

Other modes of applying the invention may be employed instead of those explained, change being made as regards the compounds and materials herein disclosed, provided the steps or compounds stated by any of the following claims or equivalent of such steps or compounds be employed.

We therefore point out and distinctly claim as our invention:

1. The method of increasing the average molecular weight of an organosiloxane polymer, containing an average of from 1 to 1.9 hydrocarbon radicals per atom of silicon as the organic portions of the molecule, which comprises treating the said polymer, in the presence of an inert solvent for the polymer starting material, with successive appreciable portions of an alkali metal hydroxide in amount totaling not more than 6 gram molecular equivalents of the alkali per 400 gram atomic weights of silicon in the organo-siloxane polymer under treatment, intermittently removing an appreciable portion of the solvent from the reaction mixture and recovering a complex organosiloxane polymer.

2. A method, as described in claim 1, wherein the organo-siloxane polymer used as a starting material contains an average of from 1.5 to 1.8 hydrocarbon radicals per atom of silicon, the majority of which hydrocarbon radicals are aryl radicals, and wherein a total of from 4 to 6 gram molecular equivalents of the alkali metal hydroxide are added in successive appreciable portions per 400 gram atomic weights of silicon in the organo-siloxane polymer under treatment, and wherein appreciable portions of the solvent and of water formed in the reaction are intermittently distilled together from the alkali-treated mixture so as to recover a residual complex organo-siloxane polymer.

3. A method, as described in claim 2, wherein the majority of the hydrocarbon radicals of the organo-siloxane polymer used as a starting material are phenyl radicals and the remainder are alkyl radicals containing not more than 2 carbon atoms and wherein the alkali metal hydroxide is added in portionwise manner to a solution containing at least 40 per cent by weight of said organo-siloxane polymer dissolved in an inert solvent.

4. A method, as described in claim 2, wherein the organo-siloxane polymer employed as a starting material contains phenyl and methyl radicals as the organic portions of the molecule, and wherein the alkali metal hydroxide is added in portionwise manner to a solution containing at least 40 per cent by weight of the organo-siloxane polymer dissolved in an inert solvent.

5. A method, as described in claim 2, wherein the organo-siloxane polymer employed as a starting material contains phenyl and ethyl radicals as the organic portions of the molecule, and wherein the alkali metal hydroxide is added in portionwise manner to a solution of at least 40 per cent by weight of said organo-siloxane polymer dissolved in an inert solvent.

EDGAR C. BRITTON.
LAURENCE W. BYERS.

REFERENCES CITED

The following references are of record in the file of this patent:

UNITED STATES PATENTS

| Number | Name | Date |
|---|---|---|
| 2,371,068 | Rochow | Mar. 6, 1945 |
| 2,432,665 | Hyde | Dec. 16, 1947 |

FOREIGN PATENTS

| Number | Country | Date |
|---|---|---|
| 573,960 | Great Britain | Dec. 14, 1945 |
| 583,875 | Great Britain | Jan. 1, 1947 |

OTHER REFERENCES

Meads et al., J. Chem. Soc. (London), 1915, pages 459–468.

Kipping et al., J. Chem. Soc. (London), 1928, pages 1427–1431.